No. 866,367. PATENTED SEPT. 17, 1907.
C. VON KUSSEROW.
VEHICLE WHEEL.
APPLICATION FILED JAN. 26, 1906.

2 SHEETS—SHEET 1.

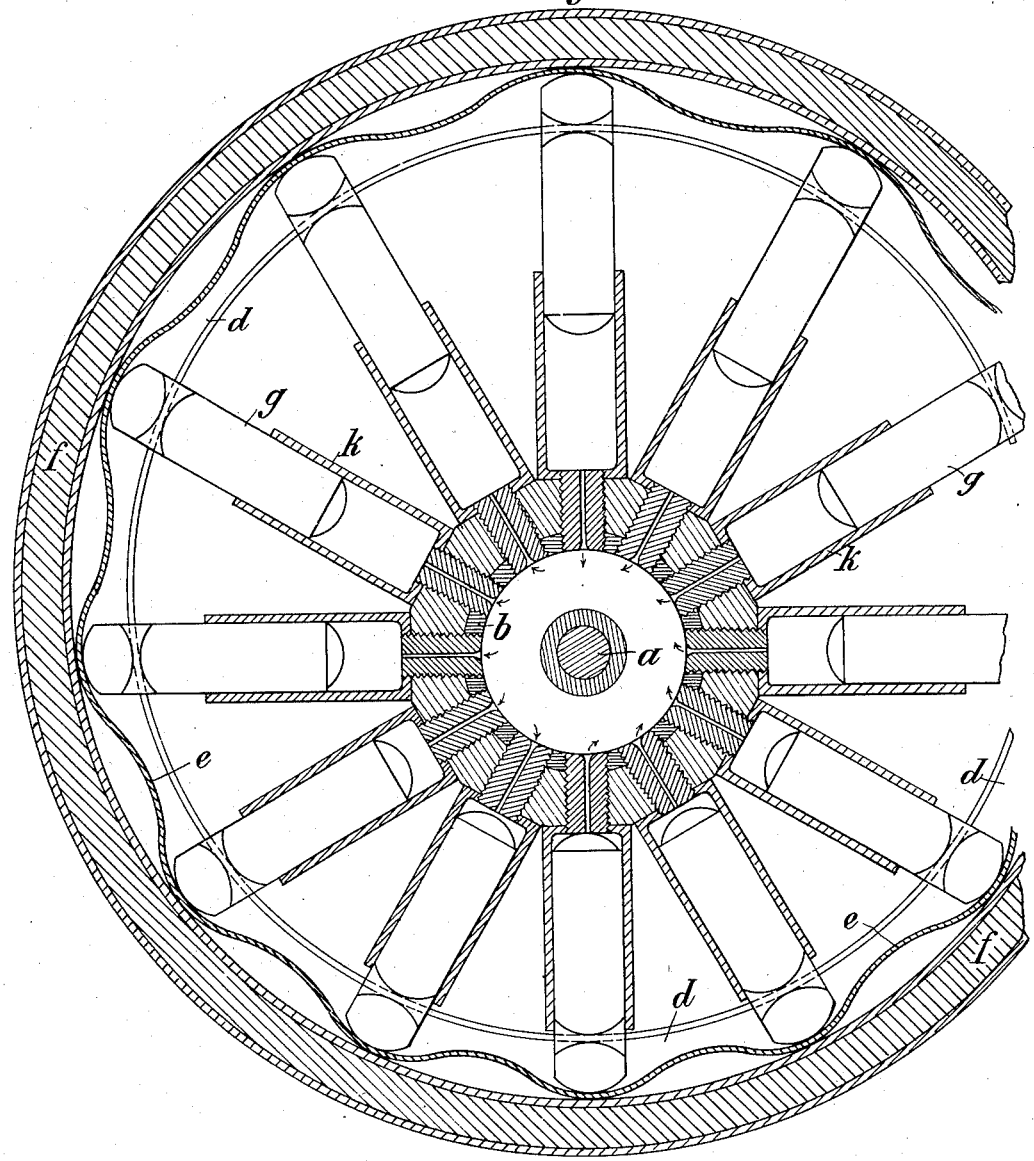

UNITED STATES PATENT OFFICE.

CURT VON KUSSEROW, OF LÜBBECKE, GERMANY.

VEHICLE-WHEEL.

No. 866,367.　　　Specification of Letters Patent.　　　Patented Sept. 17, 1907.

Application filed January 26, 1906. Serial No. 298,035.

*To all whom it may concern:*

Be it known that I, CURT VON KUSSEROW, a subject of the German Emperor, and a resident of Lübbecke, in Westphalia, Germany, have invented new and useful Improvements in Wheels for Vehicles of all Kinds, of which the following is a specification.

My invention relates to and has for its object a wheel for road vehicles of all kinds, automobiles, ordnance etc.

An important object of my invention is to obviate the arrangement of special springs which easily break on uneven roads and to obviate the costly and insecure air-tires and the like. For this purpose, the necessary springing is arranged in the wheel spokes themselves, but the spokes must not be rigidly connected with the felly, because the rim of the wheel is displaced with respect to the axle and thereby the spaces between the ends of the spokes vary. The spoke-heads must thus slide on the felly in a circumferential direction, but must thereby experience so great a resistance that the wheel tire is moved with the spokes. I attain this in my present invention by having the inside of the felly made wave-shaped. The spoke-heads slide up or down the waves in the springing of the wheel and thereby experience such a resistance that the spoke-heads also rotate the outside tire and the felly round the axle, but a continued sliding of the spoke-heads on the felly is, however, not limited.

Figure 1:
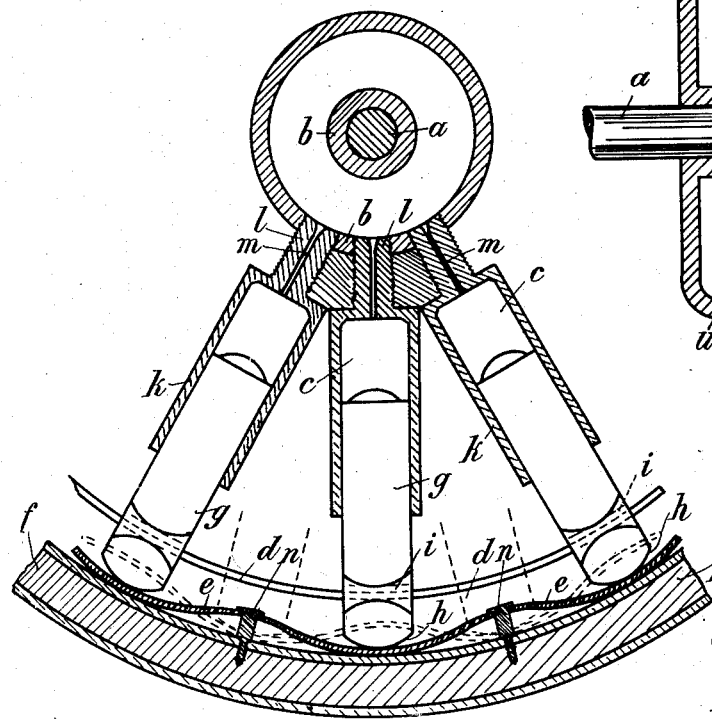
Figure 2:
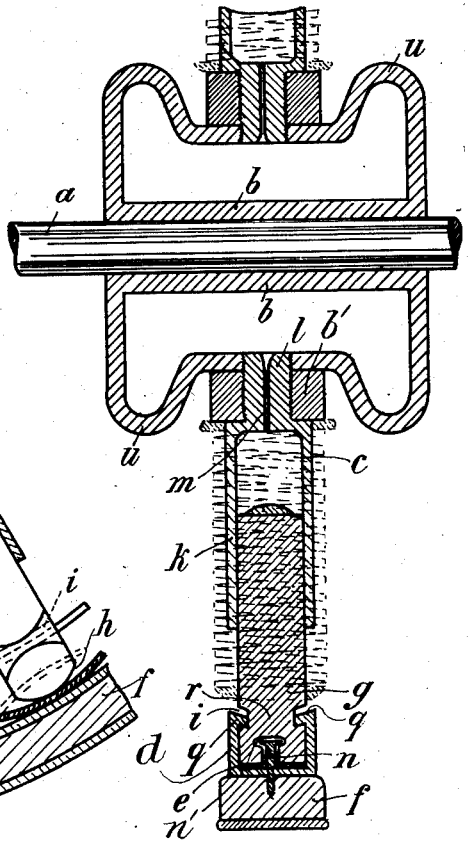
Figure 3:
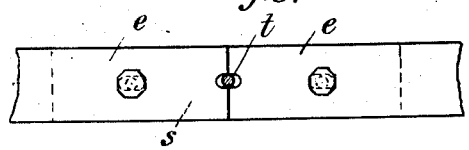
Figure 4:
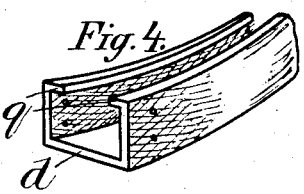

The accompanying drawings illustrate my present invention in which:

Figure 1 is a longitudinal section of a part of the wheel. Fig. 2 is a section in the direction of the axle and shows a spiral spring drawn over the spoke which has the purpose of quickly drawing out equally the spokes. Fig. 3 shows the connection of the ends of the undulating or wave-shaped resilient iron band. Fig. 4 is a perspective view of the inside of the felly-rim. Fig. 5 shows the position of the wheel spokes in the springing of the wheel.

$a$ is the axle of the vehicle, which is surrounded by the nave $b$. The nave forms a reservoir (Fig. 2) inclosed in itself. The spokes $c$ are screwed into the side of the reservoir. The sides of the reservoir are surrounded with a ring $b'$ to strengthen it, through which the spokes are screwed into the sides of the reservoir. The spokes consist of an inner part $k$ in the form of a wood cylinder which is connected with the hollow space of the nave $b$ through the solid shank $l$ having the channel $m$ therethrough, and an outer part $g$ in the form of a solid cylindrical plunger. Inside the felly of the wheel a rim $d$ (U-shaped in cross-section) is fastened.

Fig. 2 shows in longitudinal section one of the plunger-shaped parts $g$ of the spokes along with the part of the felly to which it belongs. The felly-rim $d$ has two flanges $q$ which fit into recesses $i$ of the part $g$ of the spokes. The flanges $q$ are pressed firmly within the recesses $i$ formed in the sides of the lower ends $r$ of the plunger sections $g$ of the spokes, whereby every turning of the spokes round their axes is prevented. Further, the ends of the spokes are laterally fitted exactly to the rim $d$ in order to give to the wheel the necessary resistance to side-thrust. The edges of the recesses $i$, as seen in Fig. 1, are curved in the arc of a circle and allow a small space for play between them and the flanges $q$. As is further seen from Fig. 1, the heads $h$ of the plungers $g$ are rounded off at the ends $r$ and are supported at these round ends on the wave-shaped resilient band $e$ disposed within the U-shaped felly rim $d$.

The band $e$ is secured to the felly rim by the headed pins $n$ passing through apertures in the resilient band $e$ sufficiently large to allow the band $e$ to be sprung downwardly, whereby the lowermost portions of the band are simultaneously buckled upwardly. The lower ends of the spokes are recessed or slotted as at $n'$ (Fig. 2) to allow them to pass over the pins $n$ during the movement of the star wheel around the felly rim. The joinder of the undulating or wave-shaped spring band is attained by a connecting band $s$ secured by a headed pin $t$, as shown in Fig. 3.

The springing of the wheel is brought about in the following manner: The nave is filled with purified glycerin so far that, after all the spoke-cylinders are filled to normal height, only so much air is left remaining as is requisite for springing and for the equalization of the level of the fluid. The nave is then screwed up and the wheel is ready for use. As is seen from Fig. 2, the nave $b$ is made of somewhat larger diameter at both sides of the spokes, whereby hollow spaces $u$ are obtained which lie higher than the opening of the channel $m$ of the inside of the spokes. The consequence is that the air which remains in the nave does not get into the cylinder and from there escape, since, in consequence of its less weight, it is always pressed by the glycerin into the highest part of the nave.

As is seen from Fig. 5 the spokes under the axle are shortened under a load on the wheel by the plungers $g$ being pushed into the cylinder $k$, while on the opposite side the plungers are drawn out from the cylinder by the clasping or friction of the U-band and also by the coil spring shown in Fig. 2. The consequence of this is that when the axle of the wheel is displaced, the spaces between the ends of the spokes vary. The spoke-heads must thus move on the felly in a circumferential direction, but must have so great a resistance that the wheel tire is moved with the spokes. This is attained in the present invention by providing the inside of the felly with an undulating spring band. Whenever the spaces between the ends of the spoke heads vary, a corresponding change takes place in the shape of the undulations in the spring band. This change of shape offers such resistance to further circumferential movement of the spoke heads that they rotate the spring band and with it the rim. In other words, whenever the spokes are radially displaced, there is a corresponding alteration in the amplitude of the curves in the undulating spring band. The resistance which the band offers to this change in shape is sufficient to limit to a small movement for the time being the circumferential sliding of the spokes. Thus the spokes while completely displaceable relatively to the felly and unlimitedly movable in a circumferential direction, still are limited to a small degree of independent movement at a time.

What I claim and desire to secure by Letters Patent is:

1. In a wheel, the combination of a hub and felly, of radially movable spokes interposed therebetween, and means for forcing the ends of said spokes into frictional association with said felly and said spokes being unlimitedly displaceable circumferentially of the felly, and means opposing said displacement by a resistance varying with the amount of said displacement, substantially as described.

2. In a wheel, the combination with a hub and felly, said felly being provided on its inner circumference with an undulating resilient band, of radially displaceable spokes intersposed between said hub and resilient band, and means for forcing said spokes into engagement with said band, substantially as described.

3. In a wheel, the combination with a hub and felly, said felly being provided on its inner circumference with a U-shaped channel, of an undulating resilient band secured within said channel, radially displaceable spokes interposed between said hub and said resilient band, and means for holding the outer ends of said spokes in engagement with said band, substantially as described.

4. In a wheel, the combination with a hub and felly, of an undulating resilient band disposed around the inner circumference of said felly, means for securing said band against circumferential displacement comprising headed pins passing through apertures in said band and secured to said felly, radially displaceable spokes interposed between said hub and resilient band and provided at their ends with slots to allow of passage over said headed pins, and means for forcing said slotted ends of said spokes in engagement with said resilient band, substantially as described.

5. In a wheel, the combination with a hub and felly, of a U-shaped rim secured to the inner circumference of said felly and provided with inwardly disposed lateral flanges, sectional spokes interposed between said hub and rim, the outer section of said spokes being radially displaceable and provided with side recesses adapted to receive the lateral flanges of said rim, and means for forcing outwardly the displaceable sections of said spokes, substantially as described.

6. In a wheel, the combination with a hollow hub forming a closed receptacle, of a felly, a springing resistance member disposed around the inner circumference of said felly, and radially displaceable spokes interposed between said hub and resistance member, comprising an inner and an outer section, said inner section being in the form of a cylinder having an opening communicating with the interior of said hub and said outer section comprising a plunger operating within said cylinder, said cylinders and hub being charged with suitable cushioning fluid, substantially as described.

7. In a wheel, the combination with a hollow hub forming a closed receptacle, of a felly, an undulating resilient band disposed around the inner circumference of said felly, means for securing said band against circumferential displacement, a spoke member comprising a cylinder having an opening communicating with the interior of said hub, a second spoke member comprising a plunger operating in said cylinder and at its outer end engaging said resilient band, said hub and cylinders containing suitable cushioning fluid, substantially as described.

In testimony, that I claim the foregoing as my invention, I have signed my name in presence of two witnesses.

CURT VON KUSSEROW.

Witnesses:
F. REICH,
C. DIEDERICH.